United States Patent
Walker et al.

(10) Patent No.: US 7,363,479 B1
(45) Date of Patent: Apr. 22, 2008

(54) METHODS AND APPARATUS FOR PROVISIONING SERVERS TO CLIENTS

(75) Inventors: Philip M. Walker, Fort Collins, CO (US); Roy L. Johnson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 433 days.

(21) Appl. No.: 11/115,863

(22) Filed: Apr. 26, 2005

(51) Int. Cl.
*G06F 9/00* (2006.01)
*G06F 9/24* (2006.01)
*G06F 15/177* (2006.01)
*G06F 1/24* (2006.01)

(52) U.S. Cl. ............................................. 713/1; 713/2
(58) Field of Classification Search .................... 713/1, 713/2
See application file for complete search history.

(56) References Cited

U.S. PATENT DOCUMENTS

| 6,066,182 A * | 5/2000 | Wilde et al. ................. 717/175 |
| 6,115,815 A * | 9/2000 | Doragh et al. .................. 713/2 |
| 6,209,088 B1 * | 3/2001 | Reneris ........................... 713/1 |
| 6,968,450 B1 * | 11/2005 | Rothberg et al. ............... 713/1 |
| 2005/0278523 A1 * | 12/2005 | Fortin et al. ..................... 713/1 |
| 2006/0015505 A1 * | 1/2006 | Henseler et al. ............. 707/10 |
| 2006/0200691 A1 * | 9/2006 | Yomo et al. ................. 713/323 |

* cited by examiner

*Primary Examiner*—Chun Cao
*Assistant Examiner*—Michael Wang

(57) ABSTRACT

In one embodiment, a server is provisioned to a client by: 1) pre-booting a server of a server pool using a client-neutral operating system image, before the server is provisioned to the client; 2) provisioning the pre-booted server to a virtual network of the client; 3) mounting client storage volumes to the provisioned server; and then 4) processing a client-specific configuration file. Other related methods and apparatus are also disclosed.

17 Claims, 3 Drawing Sheets

METHODS AND APPARATUS FOR PROVISIONING SERVERS TO CLIENTS

BACKGROUND

A data center is a collection of secure, fault-resistant resources that are accessed by users over a communications network (e.g., a wide area network (WAN) such as the Internet). By way of example only, the resources of a data center may comprise servers, storage, switches, routers, or modems. Often, data centers provide support for corporate websites and services, web hosting companies, telephony service providers, internet service providers, or application service providers.

Some data centers, such as Hewlett-Packard Company's Utility Data Center (UDC), provide for virtualization of various resources within the data center. For example, a data center may comprise a server pool from which servers may be dynamically provisioned to form one or more virtual networks. The virtual networks may then be provisioned to one or more clients.

When provisioning resources to the clients of the data center, it is desirable to do so as expeditiously as possible so that clients' computing demands are met in a timely fashion.

SUMMARY OF THE INVENTION

In one embodiment, a method for provisioning a server to a client comprises pre-booting a server of a server pool using a client-neutral operating system image, before the server is provisioned to the client. The pre-booted server is then provisioned to a virtual network of the client; client storage volumes are mounted to the provisioned server; and then a client-specific configuration file is processed.

Other embodiments are also disclosed.

BRIEF DESCRIPTION OF THE DRAWINGS

Illustrative and presently preferred embodiments of the invention are illustrated in the drawings, in which.

DETAILED DESCRIPTION

Figure 1:
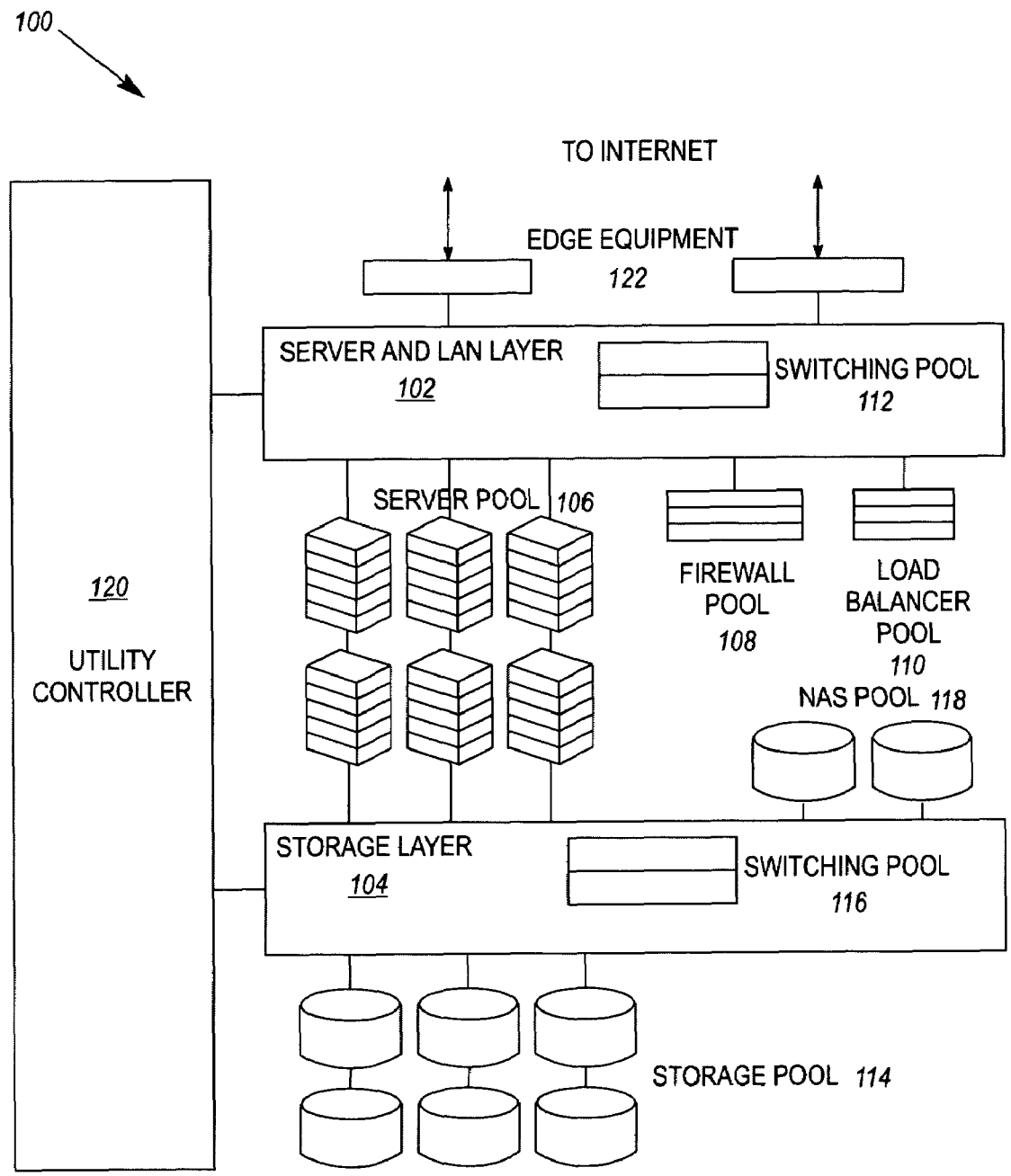
FIG. 1 illustrates an exemplary embodiment of a data center.

Portions of an exemplary data center 100 are shown in FIG. 1. The data center 100 generally comprises a virtual server and local area network (LAN) layer 102 and a virtual storage layer 104. The server and LAN layer 102 may comprise various resources, including a server pool 106, a firewall pool 108, a load balancer pool 110, a switching pool 112 and other resources (e.g., routers). The servers of the server pool 106 may take various forms, including that of a PA-RISC blade in a server rack, or a Windows™ server. The storage layer 104 may also comprise various resources, including a storage pool 114, a switching pool 116 and other resources (e.g., specific types of storage pools, such as a network area storage (NAS) pool 118 or a storage area network (SAN)).

Figure 2:
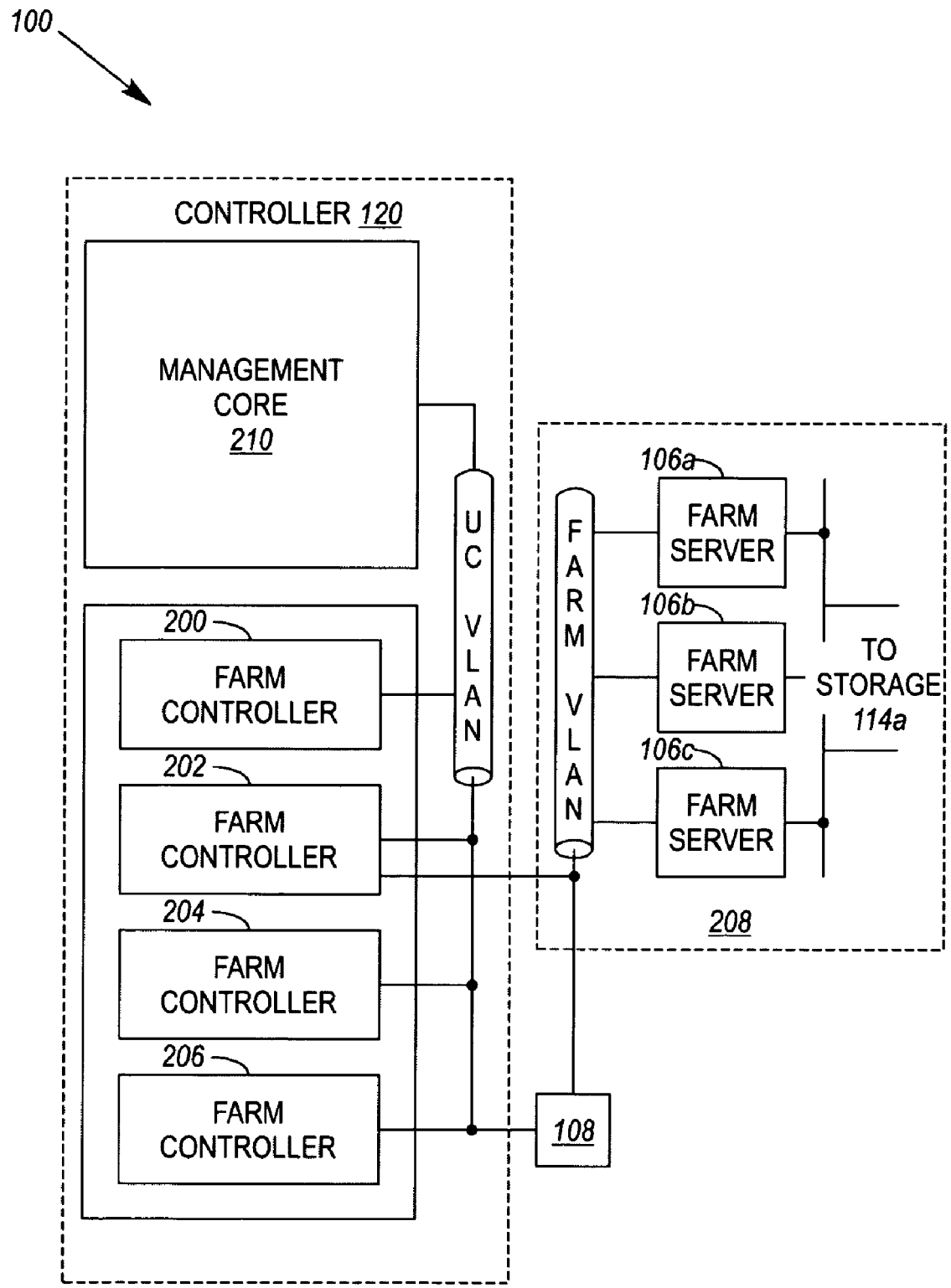
FIG. 2 provides an exemplary virtual configuration of various resources provided by the FIG. 1 data center.

The data center 100 further comprises a controller 120. As shown in FIG. 2, the controller 120 may comprise a collection of resources that, together, provide the functionality of the controller 120.

Various types of edge equipment 122 (e.g., routers, switches and load balancers) may connect the resources of the data center 100 to a wide area network (WAN) such as the Internet.

As used herein, "virtual resources" are resources that are physically connected in one way, but capable of logical presentation in different ways. In this manner, the resources may be logically presented to users of different security and trust domains, without having to physically move or rewire the resources. It should be noted, however, that the novel re-provisioning methods and apparatus disclosed herein are not limited to use by the exemplary data center 100.

FIG. 2 provides an exemplary virtual configuration of various resources provided by the FIG. 1 data center 100. As shown in FIG. 2, the controller 120 may comprise a plurality of farm controllers 200, 202, 204, 206. Machine executable instructions (i.e., program code) executed by the controller 120 may establish a number (i.e., one or more) of secure, virtual farm networks 208 by associating at least one of the farm controllers 202 with 1) a number of farm servers 106a, 106b, 106c in the server pool 106, and 2) at least one storage resource 114a in the storage pool 114. Upon selection of a farm controller 202 to control a particular virtual farm network 208, the controller 120 (and, more preferably, the farm controller 202) may dynamically create a virtual farm interface for communicating with the virtual farm network 208. In a preferred embodiment, a single farm controller 202 manages each farm network 208. In FIG. 2, only a single virtual farm network 208 (FARM VLAN) is shown.

The host controllers 200-206 may be associated with a number of different domains. For example, a controller domain (possibly comprising various subnets) may associate interfaces of the farm controllers with other controller resources, including other servers and software applications, and possibly a controller management core 210. In FIG. 2, components 200-206, 210 of the controller domain are coupled to one another via the UC VLAN. The UC VLAN may be coupled to the data center's various farm networks 208 (e.g., FARM VLAN, a farm domain) via a number of firewalls 108. In this manner, operations of the controller 120 may be secured from attack by means of the data center's farm networks 208.

When provisioning resources to the clients of the data center 100, it is desirable to do so as expeditiously as possible so that clients' computing demands are met in a timely fashion. For example, if a client operates a web server via the data center 100, and if the client has paid for a quality of service commitment, then it is desirable that an increase in the client's web traffic be satisfied by provisioning additional web servers to the client's virtual farm network, thereby ensuring that the data center's quality of service commitment is met.

Figure 3:
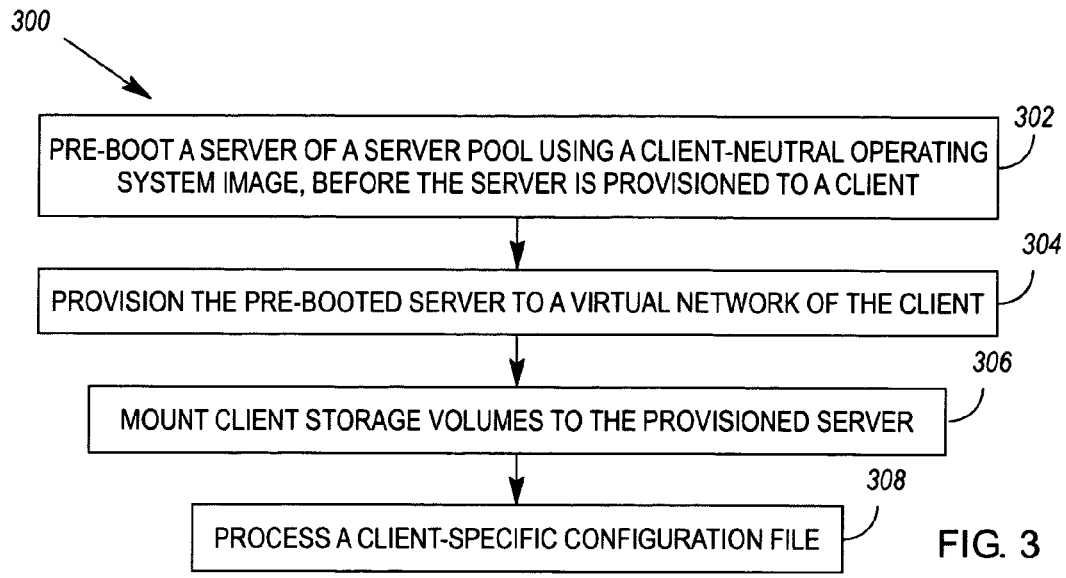
FIG. 3 illustrates a first exemplary method for provisioning a server to a client.

One source of delay in provisioning an additional server to a client's virtual network is the time it takes to boot the server, which may take seconds, minutes or in excess of an hour. To hide this delay from a client, FIG. 3 illustrates a novel method 300 for provisioning a server to a client.

The method 300 comprises pre-booting a server of a server pool using a client-neutral operating system image (e.g., an HP-UX, Windows™ or Linux image). That is, the server is booted before it is provisioned to a client. When needed, the pre-booted server is provisioned to a virtual network of a client. Client storage volumes are then mounted to the server, and a client-specific configuration file is processed. Preferably, the server is pre-booted prior to it being needed by a client. In this manner, the delay of all or part of the server's boot is incurred at non-critical time.

In some cases, the client-neutral operating system image may already be stored on a server's direct-attached storage. In other cases, the client-neutral operating system image may need to be associated with the server. For example, the operating system image may need to be copied onto the server's direct-attached storage. Or, the operating system image may need to be copied onto storage in a data center's storage pool, and the storage may then need to be associated with the server.

In one embodiment of the method 300, the pre-booting of the server comprises starting all (or substantially all) services that can be started in a client-neutral environment. Then, when the client-specific configuration file is processed, those services that are not required by the client's configuration (as specified in a client-specific configuration file) are killed. Since a service can typically be killed much faster than it can be started, this can save configuration time. This is especially so in the case of a web server, which can take significantly longer to start than to kill.

In another embodiment of the method 300, the pre-booting of the server comprises starting all operating system services that 1) can be started in a client-neutral environment, and 2) are believed to require more than a predetermined amount of time to start. Again, since a service can typically be killed much faster that it can be started, those services that take more time to start (e.g., a web server) are started during the pre-boot, and then killed if necessary. However, services that can be started more quickly, or services that are client-specific, are started after the server is provisioned to the client, in response to processing of a client-specific configuration file. The time and cost of starting a service at a non-critical time, and possibly killing the service, is therefore weighed against the time and cost of starting the service at a time when delay may be experienced by the client.

When starting services during pre-boot, some services may be client-dependent and may require client-specific data (e.g., passwords or settings). To start these services during the server's pre-boot, they may be started using client-neutral data (i.e., placeholder data). Then, when processing a client-specific configuration file, the client-neutral data may be replaced with client-specific data. In one embodiment, the client-neutral data is stored in a defined location of volatile memory (e.g., RAM). If the server's operating system does not willingly allow updates to the data, the data swap may be made, for example, by swapping data during a SCSI bus pause.

After provisioning a pre-booted server to the virtual network of a client, the processing of the client's client-specific configuration file may take the form of a mere continuation of the server's boot process, or may involve a post-boot configuration of the server. In either case, the processing of the client's configuration file may result in the configuration of some or all of the services that were started during the server's pre-boot.

Figure 4:
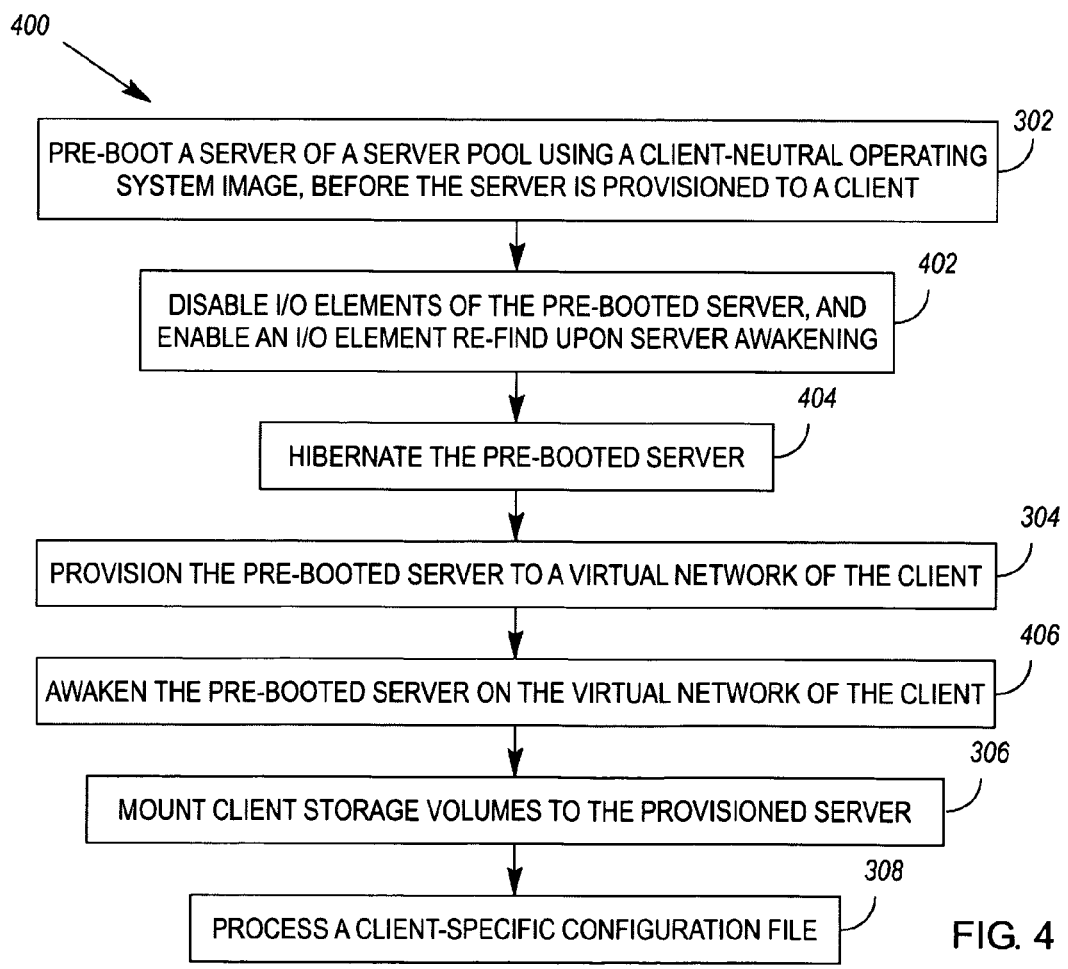
FIG. 4 illustrates a second exemplary method for provisioning a server to a client.

FIG. 4 illustrates a modified version 400 of the method 300. In accordance with the method 400, after a server is pre-booted, but before it is provisioned to a virtual network of a client, the pre-booted server is hibernated. Then, after the server is provisioned to a client's virtual network, the server is awakened on the virtual network. Optionally, I/O elements of the server may be disabled prior to the server's hibernation, and their re-find may be enabled upon server awakening. For example, in a Windows™ environment, the re-find could be enabled by enabling Windows™ plug-and-play technology.

In the data center 100, any number of the servers in the data center's server pool may be pre-booted prior to their being provisioned to the virtual farm networks of one or more data center clients. In some cases, different ones of the servers may be pre-booted using images of different operating systems. Then, when a client needs a server configured with a particular operating system, the controller 120 may provision the client a server that has been pre-booted with the particular operating system.

When pre-booting servers, the controller 120 of a data center may log into each of the servers via a client-neutral administrator login. Then, after provisioning one of the pre-booted servers to a virtual network of a data center client, the client's client-specific configuration file may be processed via a client-specific login to the server.

The methods 300, 400 may be variously embodied, but are preferably embodied in machine executable instructions (e.g., program code) that are stored on a number of machine-readable media. By way of example, the instructions may take the form of software or firmware contained within a single disk or memory, or code that is distributed amongst (and executed by) various hardware devices (e.g., the various resources of a data center 100).

The means for executing the instructions in which the methods 300, 400 are embodied may be the controller 120 of the data center 100, including any number (i.e., one or more) of the processors that are installed in its servers.

What is claimed is:

1. A method of provisioning a server to a client, comprising:
   pre-booting a server of a server pool using a client-neutral operating system image, before the server is provisioned to the client;
   provisioning the pre-booted server to a virtual network of the client; mounting client storage volumes to the provisioned server;
   and processing a client-specific configuration file;
   after pre-booting the server, but before provisioning the server to the virtual network of the client, hibernating the pre-booted server;
   wherein provisioning the server to the virtual network of the client comprises awakening the server on the virtual network of client;
   disabling I/O elements of the server and enabling an I/O element re-find upon server awakening.

2. The method of claim 1, further comprising, prior to pre-booting the server, associating the client-neutral operating system image with the server.

3. The method of claim 1, wherein the pre-booting begins a boot process that is continued by processing the client-specific configuration file.

4. The method of claim 1, wherein processing the client-specific configuration file comprises killing processes that were started during the pre-boot of the server, but which are not required by a client-specific configuration specified in the client-specific configuration file.

5. The method of claim 4, wherein processing the client-specific configuration file comprises starting client-specific processes that were not started during the pre-boot.

6. The method of claim 1, wherein processing the client-specific configuration file comprises configuring processes that were started during the pre-boot of the server.

7. The method of claim 1, wherein the pre-booting comprises starting all services that can be started in a client-neutral environment.

8. The method of claim 1, wherein the pre-booting comprises starting all operating system services that i) can be started in a client-neutral environment, and ii) are believed to require more than a predetermined amount of time to start.

9. The method of claim 1, wherein the pre-booting comprises starting client-dependent services using client-neutral data, and wherein processing the client-specific configuration file comprises replacing the client-neutral data with client-specific data.

10. The method of claim 9, wherein the client-neutral and client-specific data comprise passwords.

11. The method of claim 9, wherein the client-neutral data is replaced with the client-specific data during a SCSI bus pause.

12. The method of claim 1, wherein the pre-booting comprises starting a web server.

13. A method of provisioning a server to a client, comprising:
pre-booting a number of servers in a server pool, before the number of servers are provisioned to one or more clients;
each of the number of servers being pre-booted using a client-neutral operating system image that has been associated with the server;
provisioning a first of the pre-booted servers to a virtual network of a first client;
mounting client storage volumes to the provisioned server;
and processing a client-specific configuration file of the first client;
after pre-booting the server, but before provisioning the server to the virtual network of the first client, hibernating the pre-booted server;
wherein provisioning the server to the virtual network of the first client comprises awakening the server on the virtual network of the first client;
disabling I/O elements of the server and enabling an I/O element re-find upon server awakening.

14. The method of claim 13, wherein:
during the pre-booting of the number of servers, the servers are logged into via a client-neutral administrator login; and
after provisioning the first of the pre-booted servers to the virtual network of the first client, the client-specific configuration file is processed via a client-specific login to the provisioned server.

15. The method of claim 13, wherein:
different servers of the server pool are pre-booted using images of different operating systems; and
if the first client needs a server configured with a particular operating system, provisioning the virtual network of the first client a server that has been pre-booted with the particular operating system.

16. A data center comprising:
a server pool;
a storage pool;
a utility controller;
network edge equipment; and
machine executable instructions that, when executed by the controller, cause the data center to:
form a number of virtual networks and, via the network edge equipment,
provision the virtual networks to one or more clients of the data center;
pre-boot a number of servers in the server pool, before the number of servers are provisioned to one or more clients of the data center;
each of the number of servers being pre-booted using a client-neutral operating system image that has been associated with the server; and
in response to needs of the client(s), provision the pre-booted servers to one or more of the virtual networks,
wherein each pre-booted server is provisioned by i) mounting client storage image volumes maintained in the storage pool to the pre-booted server and
ii) processing a client-specific configuration file;
wherein the machine executable instructions further cause the data center to, after pre-booting the servers, but before provisioning the servers to the one or more virtual networks of the client(s), hibernate the pre-booted servers;
wherein provisioning the servers to the virtual network(s) of the client(s) comprising awakening the servers on the virtual network(s) of the client(s).

17. The data center of claim 16, wherein the machine executable instructions further cause the data center to, prior to pre-booting the servers, associate the servers with the client-neutral operating system image.

* * * * *